United States Patent [19]

Runciman

[11] 4,017,732

[45] Apr. 12, 1977

[54] RADIATION SCANNING SYSTEM

[75] Inventor: Herbert Morrison Runciman, Glasgow, Scotland

[73] Assignee: Barr and Stroud Limited, Glasgow, Scotland

[22] Filed: Jan. 7, 1976

[21] Appl. No.: 647,116

[30] Foreign Application Priority Data

Feb. 5, 1975 United Kingdom .............. 4843/75

[52] U.S. Cl. ................................ 250/334; 250/347
[51] Int. Cl.² ......................................... H01J 31/49
[58] Field of Search .......................... 250/330–334, 250/347, 349, 353; 350/2, 299

[56] References Cited

UNITED STATES PATENTS

| | | | |
|---|---|---|---|
| 3,745,347 | 7/1973 | DeBrey et al. | 250/334 |
| 3,781,559 | 12/1973 | Cooper et al. | 250/334 |

*Primary Examiner*—Davis L. Willis
*Attorney, Agent, or Firm*—Mason, Fenwick & Lawrence

[57] ABSTRACT

A radiation scanning system comprising a focusing lens which forms an image of radiation received from a field of view and a curved reflector is arranged to reflect radiation onto a plane mirror which is mounted for oscillatory motion about a fixed axis to thereby scan the radiation image. A relay lens is interposed between the plane mirror and a radiation detector and in the plane normal to the axis about which the plane mirror oscillates the radius of curvature of the curved reflector approximates to twice the radius of curvature of the scanned image and in this way the scanned image is presented to the detector at a substantially constant angle.

7 Claims, 12 Drawing Figures

RADIATION SCANNING SYSTEM

This invention relates to a radiation scanning system.

In a known system a plane mirror which is mounted for oscillatory motion about a fixed axis scans a radiation image formed by an imaging lens across an array of detectors (hereinafter referred to simply as a "detector"). This known system has two drawbacks which significantly limit its effectiveness, these being that as the plane mirror scans the radiation image the scanned image presented to the detector varies in angle of presentation, and the field curvature for the scanned image cannot be matched by the imaging lens without significantly increasing the size of the plane mirror which thereby impairs the effectiveness of the mechanical drive thereto.

It is an object of the present invention to provide a radiation scanning system incorporating an oscillatory scanning mirror and wherein the scanned image is presented to the detector at a substantially constant angle, such a system being referred to hereinafter as "telecentric".

According to the present invention there is provided a radiation scanning system comprising a radiation detector and an optical assembly which is arranged to scan radiation from a field of view across said detector, said optical assembly including radiation-imaging means forming an image of radiation from said field of view, a curved reflector arranged to reflect radiation from said imaging means on to a plane mirror which is mounted for oscillatory motion about a fixed axis to thereby scan said radiation image, and a relay lens means interposed between the plane mirror and the detector, the arrangement being such that said relay lens means relays said scanned image on to said detector, and in the plane normal to said axis the radius of curvature of said curved reflector approximates to twice the radius of curvature of said scanned image.

Embodiments of the present invention will now be described by way of example with reference to the accompanying drawings, in which.

Although the term "oscillation" and derivatives thereof are used herein and in the appended claims it is to be understood that the term is to embrace scane motion of the movable mirror by sinusoidal, triangular and sawtooth waveforms or other similar waveforms and is also to embrace the scan motion produced by continuous rotation of the mirror.

Figure 1:
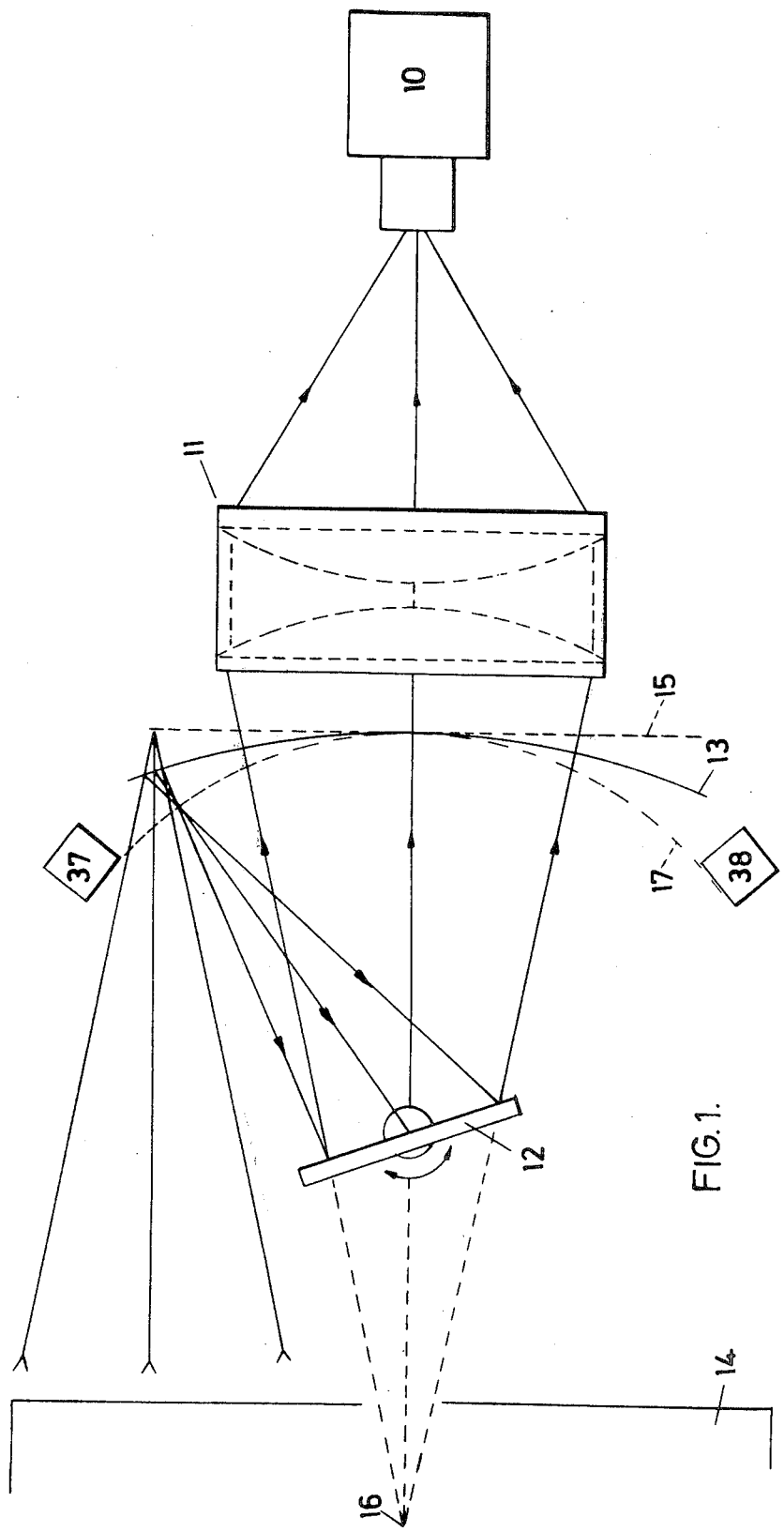
FIGS. 1 and 2 are diagrammatic drawings illustrating the principle of the present invention.

In FIG. 1 the imaging system comprises a detector 10, a relay lens arrangement 11, a plane mirror 12 which is mounted for oscillatory movement about an axis 9 (see FIG. 2) normal to the plane of the drawing and lying in the reflecting surface of the mirror 12, and a curved field reflector or mirror 13. Radiation from a field of view is imaged on to an image plane 15 by imaging means diagrammatically depicted at 14 and which may be either reflective or refractive. The curved reflector 13 has its centre of curvature (for the plane of the drawing) at the point 16 and thus the image appearing at the plane 15 (in the absence of the reflector 13) appears at a surface 17 which has a centre of curvature (for the plane of the drawing) centred upon the axis of rotation of the plane mirror 12. The relay lens arrangement 11 is chosen so that it images the point 16 and consequently during scanning by the mirror 12 an image of the surface 17 is swept across the detector 10. In this way the scanned image of the radiation from the field of view is presented to the detector 10 at a constant angle and the flat field produced by the imaging means 14 (which has its exit pupil at infinity) is scanned without distortion.

Figure 2:
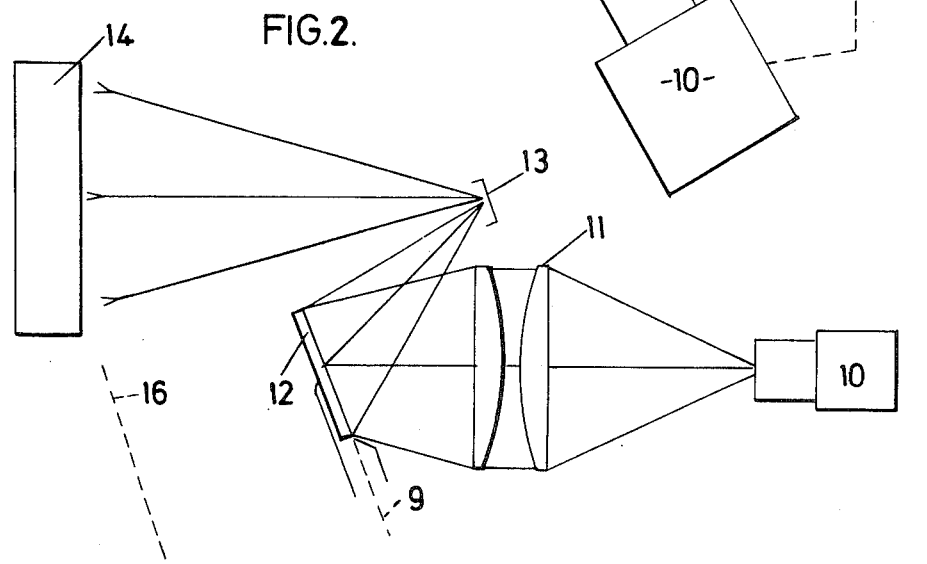

In the arrangement of FIG. 1 partial obscuration of the field of view occurs by virtue of the position of the mirror 12. Since the radiation image lies in a plane 15 it follows that obscuration can be avoided without affecting the performance of the system by inclining the mirror 12 and reflector 13 as shown diagrammatically in FIG. 2 wherein the angle of offset of the reflector 13 equals that of the mirror 12 so tht the principal ray from the imaging optics (not shown) is parallel to the principal ray entering the detector 10. FIG. 2, of course, illustrates the system in a plane at right angles of the plane of FIG. 1 and hence the axis of oscillation 9 for the mirror 12 is depicted and the reflector 13 can be seen to form part of a cylinder having its axis 16 approximately twice as distant from the reflector 13 as the axis 9.

Figure 3:
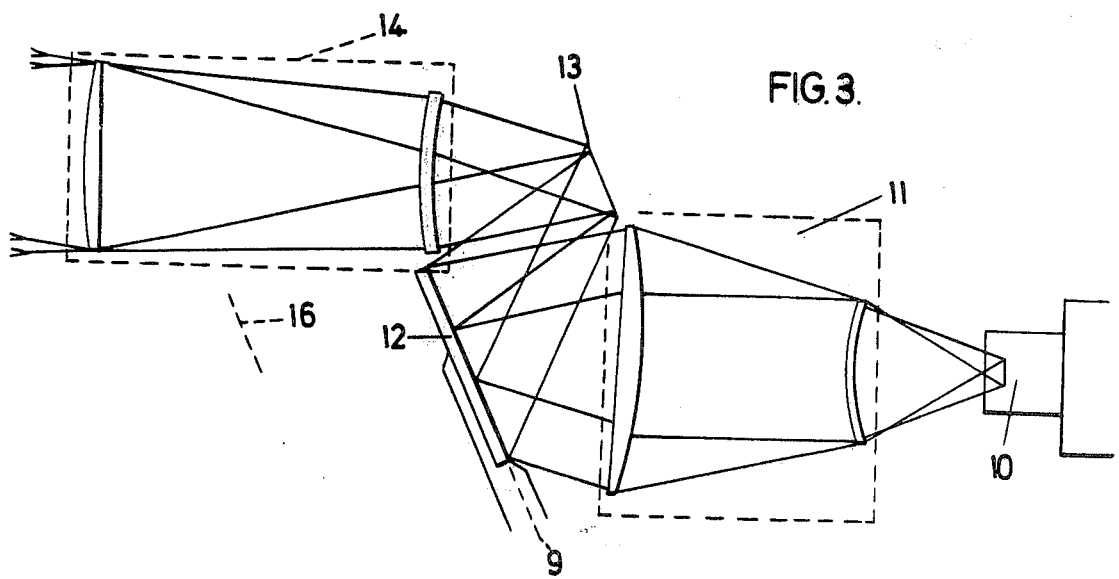
FIG. 3 is a more detailed view of the system shown in FIG. 2.

In FIG. 3 the arrangement of FIG. 2 is shown in greater detail, wherein the main imaging means 14 are themselves telecentric and the array of detector elements in the detector 10 is illustrated.

Figure 4A:
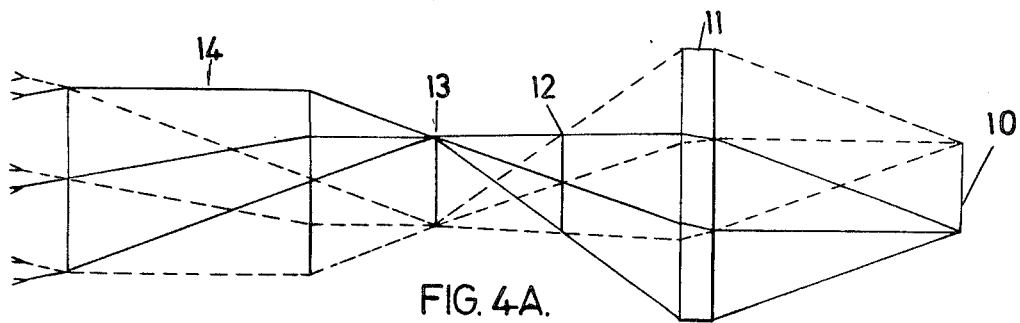
FIGS. 4A to 4D illustrate different systems in unfolded ray diagram form.
Figure 4B:
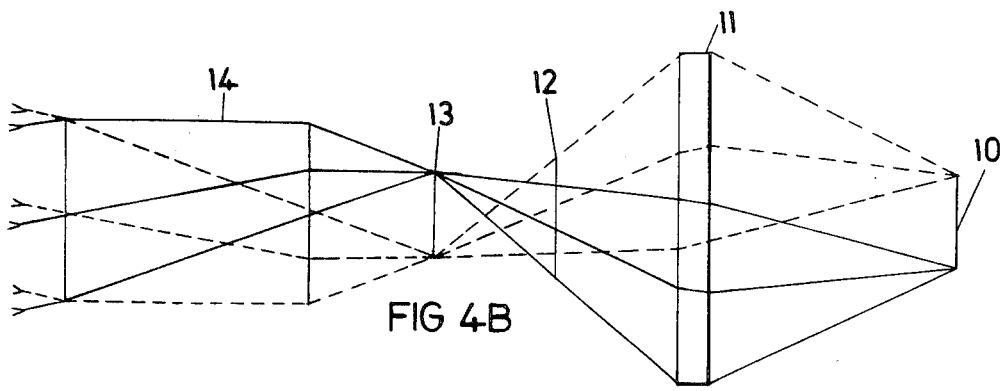
Figure 4C:
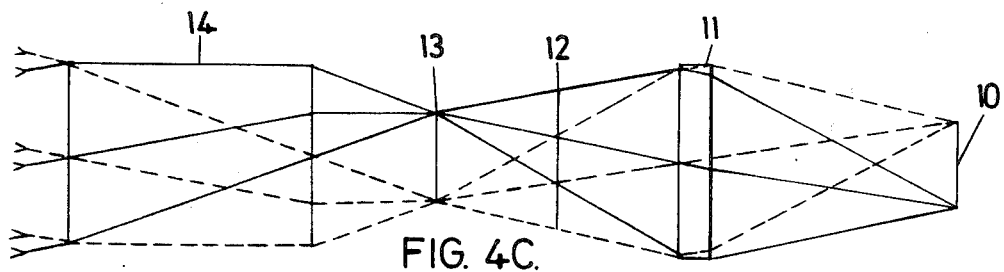
Figure 4D:
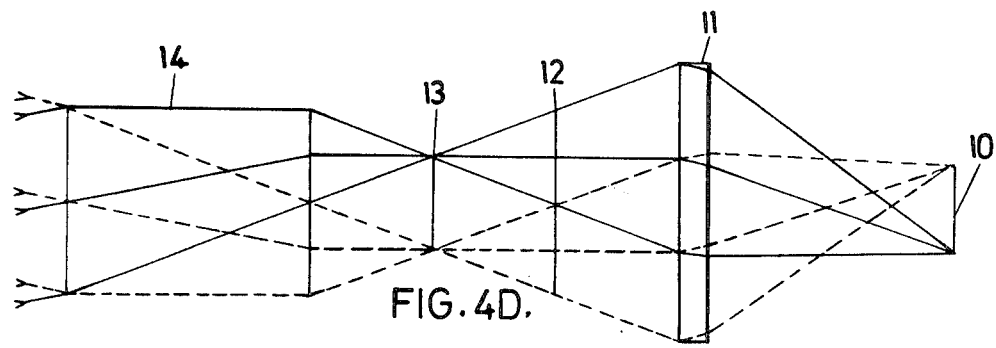

The field reflector 13 may form part of a cylinder as has been described or part of a sphere or part of a toroid as will be described with reference to FIGS. 4A to D each of which is an "unfolded" ray diagram of the system taken in the plane containing the oscillation axis 9. The alternative forms of the field reflector 13 for a given imaging means 14 (having an exit pupil at infinity) result in different dimensions of the oscillating mirror 12 and the relay lens arrangement 11 for a given size of detector 10. FIG. 4D utilises a cylindrical field reflector 13 (used in the inclined arrangement of FIG. 2 to avoid obscuration) and this results in fairly large oscillating mirror 12 and lens arrangement 11. FIG. 4A utilises a spherical field reflector 13 used on axis and as a result of the power of the reflector 13 in the cross-section considered a relatively small mirror 12 results but the dimension of the lens arrangement 11 remains substantially unaltered. FIG. 4B illustrates a practical arrangement of FIG. 4A, by inclining the reflector 13 and the mirror 12 and as a result the mirror 12 requires to be slightly increased in size (in comparison to FIG. 4A) and the lens arrangement 11 is also increased in size. The inclination used in FIG. 4B introduces astigmatism which can be overcome using a toroidal field reflector 13. FIG. 4C utilises a field reflector 13 which forms part of a toroid (used in an inclined arrangement to avoid obscuration) and this results in a compromise in size of field reflector 13 and lens arrangement 11. It should be noted that in the case or toroidal or spherical field reflectors the relay optics should themselves have a field curvature to compensate for the curvature introduced by the field reflector 13.

Figure 5A:
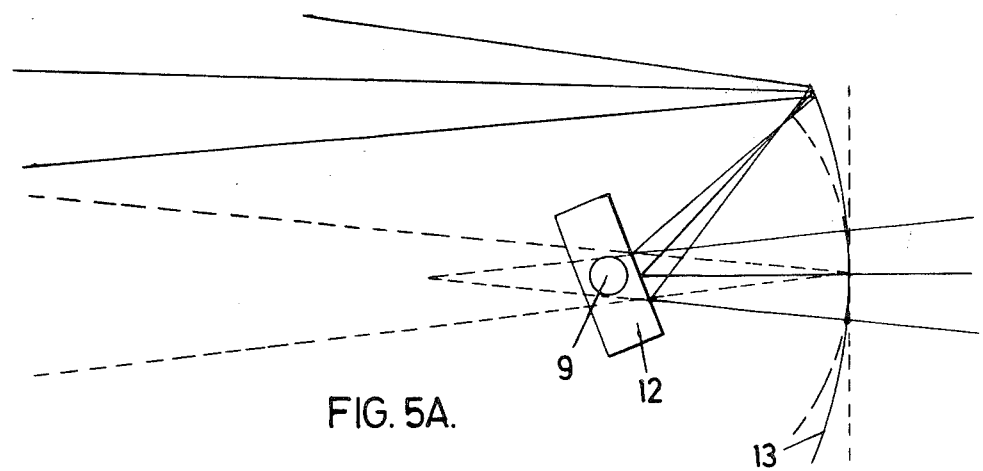
FIGS. 5A to 5C illustrate different modifications of the system illustrated in FIGS. 1 and 2.
Figure 5B:
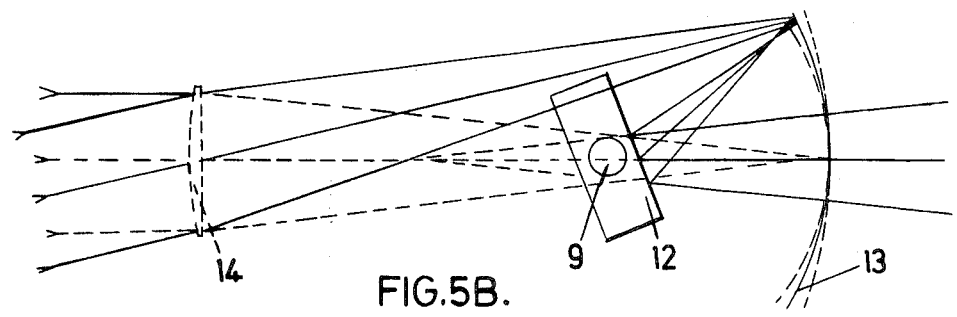
Figure 5C:
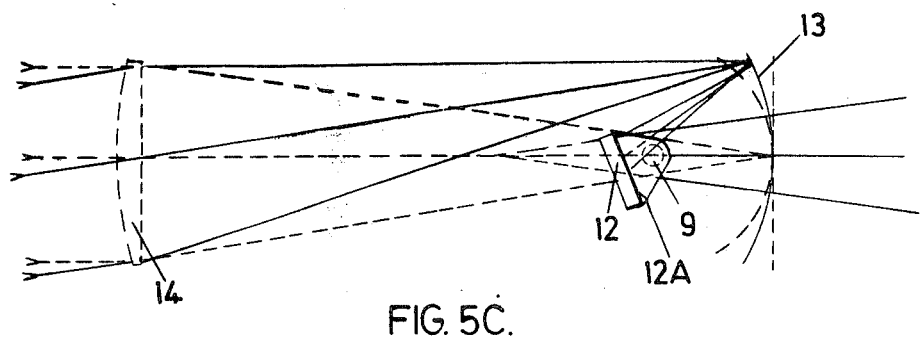

In the various system described hereinbefore the image surface of the main imaging means 14 is in close proximity to the surface of the field reflector 13 and this requires that the reflector 13 is free from surface defects or dust which would otherwise appear substantially in focus at the detector 10. Another practical problem is providing an oscillatory mirror 12 the reflecting surface of which contains the axis of oscillation 9. It may be necessary to use a thick mirror wherein the reflecting surface is offset from the centre of mass (through which the axis of oscillation will pass) in which case telecentric scanning with a limited amount of distortion can be achieved if the exit pupil of the main objective is situated at a large distance behind the field reflector, as is shown in FIG. 5A. An alternative arrangement providing the same result is shown in FIG. 5B wherein a single element objective lens means 14 is used in combination with a field reflector 13 of increased power such that the exit pupil coincides with the lens means 14. A flat field without distortion can be achieved with the arrangement shown in FIG. 5C wherein the reflecting surface 12A of the oscillating mirror 12 is displaced from the axis of oscillation 9 away from the field reflector 13.

Figure 6:
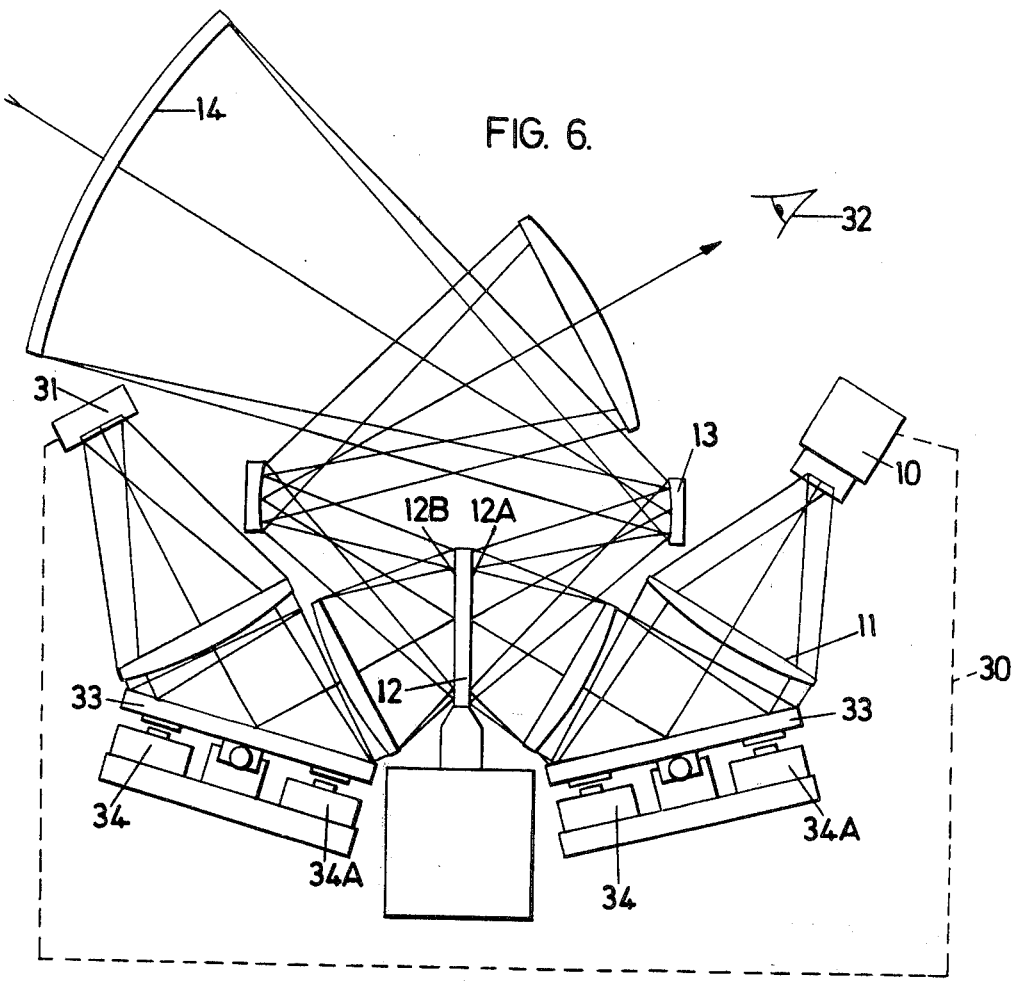

In a practical arrangement illustrated in FIG. 6 a thick mirror 12 is used on a first surface 12A to scan radiation in the infrared waveband (3 μm to 14 μm) on to a detector 10 each element of which is linked by an electrical circuit 30 to modulate the output from an array 31 of light-emitting-diodes (LEDs) the visible radiation from which is passed through a complementary optical system incorporating the rear surface 12B of the mirror 12 to be viewed at 32 by an operator. The arrangement of FIG. 6 incorporates a pair of plane mirrors 33 mounted for pivotal movement upon actuation of one or other of a pair of electromagnets 34,34A whereby interlacing of successive scans can be achieved. The mirror 33 which is in the infrared radiation path is located between components forming the relay lens 11.

Figure 7:
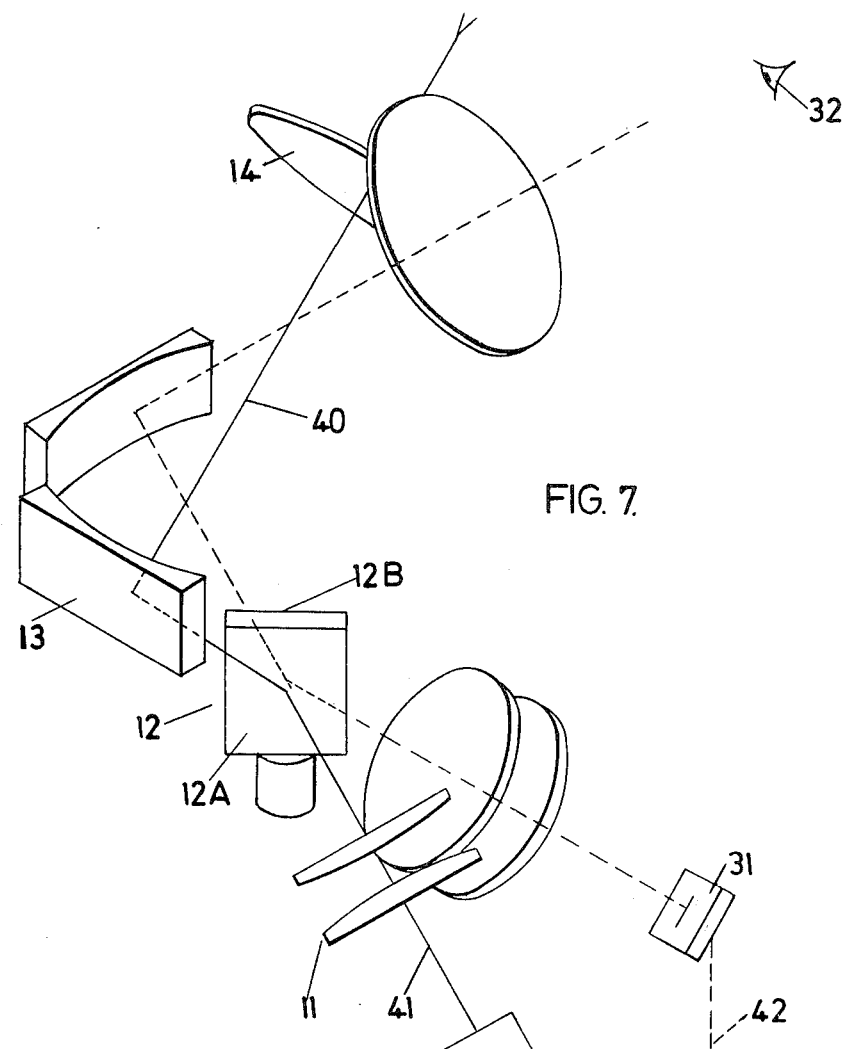
FIGS. 6 and 7 illustrate different forms of practical radiation scanning systems with infrared to visual display transformation capability.

In an alternative practical arrangement illustrated in FIG. 7 the principal ray 40 from the radiation imaging means 14 is approximately at right angles to the principal ray 41 entering the detector 10 the elements of which are coupled by a circuit 32 to an LED array 31 to permit visual viewing of the radiation field.

All the systems described herein may be provided with one or more auxiliary radiation sources arranged to apply radiation to the detector 10 at a selected part or parts of the scan. Sources such as 37,38 of FIG. 1 may be provided. As an alternative method of providing a characteristic feature to be detected the ends of the field reflector may be treated or alternatively an auxiliary imaging system located at the end of the scan across the field reflector may be used to direct radiation from an auxiliary source to the detector. It is also to be understood that depending upon the amount of distortion which can be tolerated in the detected image the radius of curvature of the field reflector may vary from being exactly equal to twice the radius of curvature of the scanned image.

I claim:

1. A radiation scanning system comprising a radiation detector and an optical assembly which is arranged to scan radiation from a field of view across said detector, said optical assembly including radiation-imaging means forming an image of radiation from said field of view, a curved reflector arranged to reflect image-forming radiation from said imaging means, a plane mirror mounted for oscillatory motion about a fixed axis to thereby scan radiation reflected from said curved reflector, and a relay lens means interposed between the plane mirror and the detector to relay said scanned radiation image on to said detector and, in the plane normal to said axis the radius of curvature of said curved reflector approximates to twice the radius of curvature of said scanned radiation image.

2. A radiation scanning system according to claim 1, wherein said fixed axis passes through the reflecting surface of said plane mirror.

3. A radiation scanning system according to claim 1, wherein said curved reflector forms part of a sphere.

4. A radiation scanning system according to claim 1, wherein said curved reflector forms part of a cylinder.

5. A radiation scanning system according to claim 1, wherein said curved reflector forms part of a toroid the major radius of which forms said radius of curvature.

6. A radiation scanning system as claimed in claim 1, wherein said optical assembly is capable of handling radiation in the infrared waveband and said detector is sensitive to infrared radiation, and said system further includes a second optical assembly capable of handling radiation in the visible waveband and a light source which is coupled to the output of said detector so that the visible radiation output by said source is modulated in accordance with detected infrared radiation, said second optical assembly including second lens means, a second curved reflector arranged to reflect radiation from said second lens means, a second plane mirror located intermediate the second lens means and the second curved reflector and mounted for oscillatory motion about a second fixed axis, means synchronising the oscillatory motion of the first plane mirror with that of the second plane mirror and a viewing lens arranged to permit visible radiation from said light source to be viewed after reflection from said second curved reflector.

7. A radiation scanning system as claimed in claim 6, wherein said first and second plane mirrors are mounted integrally on a common carrier member.

* * * * *